(12) United States Patent
Sandström

(10) Patent No.: US 7,484,034 B2
(45) Date of Patent: Jan. 27, 2009

(54) MICROCONTROL ARCHITECTURE FOR A SYSTEM ON A CHIP (SOC)

(75) Inventor: Kim Sandström, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/787,966

(22) Filed: Apr. 18, 2007

(65) Prior Publication Data

US 2007/0198991 A1 Aug. 23, 2007

Related U.S. Application Data

(62) Division of application No. 10/961,661, filed on Oct. 8, 2004.

(60) Provisional application No. 60/510,680, filed on Oct. 10, 2003.

(51) Int. Cl.
*G06F 13/00* (2006.01)
*G06F 13/42* (2006.01)
*G06F 13/14* (2006.01)

(52) U.S. Cl. .................. 710/316; 710/105; 710/305

(58) Field of Classification Search ............. 710/29, 710/62, 72, 105–106, 110, 305, 316, 317
See application file for complete search history.

(56) References Cited

U.S. PATENT DOCUMENTS

| | | | | |
|---|---|---|---|---|
| 4,395,757 A | * | 7/1983 | Bienvenu et al. | 718/104 |
| 5,214,769 A | | 5/1993 | Uchida et al. | 711/151 |
| 5,838,603 A | * | 11/1998 | Mori et al. | 365/63 |
| 5,862,180 A | | 1/1999 | Heinz | 375/244 |
| 5,907,542 A | * | 5/1999 | Kuehnel et al. | 370/331 |
| 6,393,506 B1 | | 5/2002 | Kenny | 710/113 |
| 7,088,735 B1 | | 8/2006 | Reohr et al. | 370/466 |
| 2001/0042147 A1 | * | 11/2001 | Adams et al. | 710/100 |
| 2002/0091898 A1 | * | 7/2002 | Matsunami et al. | 711/114 |
| 2002/0120888 A1 | * | 8/2002 | Franke | 714/42 |
| 2002/0172197 A1 | | 11/2002 | Dale et al. | 370/386 |
| 2003/0167365 A1 | | 9/2003 | Kubalska et al. | 710/113 |

OTHER PUBLICATIONS

Nair, Ravi "Effect of increasing chip density on the evolution of comptuer architectures". IBM Journal of Research and Development. vol. 45 No. 2/3. Mar./May 2002. pp. 223-234.*

(Continued)

*Primary Examiner*—Mark Rinehart
*Assistant Examiner*—Thomas J Cleary
(74) *Attorney, Agent, or Firm*—Harrington & Smith, PC

(57) ABSTRACT

A data processing system includes a main processor that runs an operating system; a microcontrol processor coupled to the main processor that controls a first plurality of hardware processes as directed by the main processor, and a switching matrix controlled by the microcontrol processor and coupled between input ports and output ports of individual ones of the first plurality of hardware processes for routing data between individual ones of the first plurality of hardware processes. In one aspect there is a unit having an interface for coupling to at least one peripheral unit, where each of the unit and the peripheral unit include a system on a chip. Operations of a local microcontrol processor of the unit are directed through macro commands issued by the main processor, and for the execution of some macro commands the local microcontrol processor of the unit communicates with the local microcontrol processor of the peripheral unit via an interconnecting bus that implements a plurality of virtual channels.

37 Claims, 6 Drawing Sheets

OTHER PUBLICATIONS

"Newton's Telecom Dictionary". 19th Edition. Mar. 2003. Entry 'ATM'. p. 78. ISBN 1-57820-307-4.*

Davis, Leroy. "ATM Bus Description, Asynchronous Transfer Mode" Webpage. Online Nov. 3, 2007. Retrieved from Internet Nov. 29, 2007. <http://www.interfacebus.com/Design_Connector_ATM.html>.*

"Wikipedia". Entry 'Asynchronous Transfer Mode'. Online Nov. 27, 2007. Retrieved from Internet Nov. 29, 2007. <http://en.wikipedia.org/wiki/Asynchronous_Transfer_Mode>.*

"Newton's Telecom Dictionary". 19th Edition. Entry 'Agent'. Mar. 2003. Harry Newton. p. 51.*

Texas Instruments, Innovator Development Kit for the OMAP Platform, User's Guide, SPRU667, Jul. 2003, 107 pgs.

* cited by examiner

MICROCONTROL ARCHITECTURE FOR A SYSTEM ON A CHIP (SOC)

CLAIM OF PRIORITY FROM COPENDING NON-PROVISIONAL PATENT APPLICATION

This application is a divisional application of U.S. patent application Ser. No. 10/961,661, filed on Oct. 8, 2004, which in turn claims priority under 35 USC 119(e) from Provisional Patent Application No. 60/5 10,680, filed Oct. 10, 2003.

TECHNICAL FIELD

The embodiments of this invention pertain to a System on a Chip (SoC) architecture, where a main processor controls data flow and hardware (HW) acceleration of the architecture, using an operating system (OS), such as Symbian OS™ (Symbian and Symbian OS are registered trademarks of Symbian Software Limited Corporation), to pass control commands to software (SW), preferably a microcoded software assisted subsystem that is used to set up and control processes and data flow. The controlled processes can be both on-chip and off-chip processes, which are interconnected by fast communication links.

BACKGROUND

Typical data processor bus system configurations are too slow for use in SoC architecture communications, especially in the case where multiple data streams are simultaneously used. Multiple data streams are typically needed whenever real-time, multimedia, or other high capacity streams are to be transferred or looped through processing units, such as hardware accelerators.

A problem of particular interest relates to the emergence of multimedia applications, and the increased performance demands imposed by third generation (3G) wireless telecommunications systems. This evolution in wireless telecommunications has increased the need for HW acceleration and buffering in mobile phone architectures. However, the integration of the HW processes on a SoC in order to yield a flexible system having a small software overhead is problematic.

Serial buses are the preferred choice for fast off-chip communication, since parallel data buses typically require more connection pins and are prone to skewing errors when used for high speed data transfer. The use of the typical on-chip serial bus for off-chip communications is limited, however, because of the requirement to provide a clocking signal. The clocking signal can be regenerated, which slows down the system, or alternatively asynchronous signaling can be employed.

Failure by a single bus to provide sufficient data transfer speed can quickly become a system bottleneck, making the use of multiple point-to-point connections advantageous in a typical SoC architecture. These multiple point-to-point data streams are, however, complicated to control in a flexible way. The dynamic control of data flow in a SoC architecture is an important consideration when implementing flexible software-driven applications.

Modern Graphical User Interface (GUI) driven multimedia applications generate various and changing data transfer and processing tasks that need to be executed on a hardware platform. The processing of data streams in telecommunications has a great need for hardware acceleration. As was noted above, the emergence of multimedia applications and 3G performance has increased the need for HW acceleration in mobile phone and other architectures.

The flexibility of any type of HW acceleration relies on the operating system being capable of triggering and controlling the HW acceleration, and further having an ability to connect the needed data inputs and data outputs with little overhead. Typically a SW process implementation is used in order to provide flexibility to the system, and HW process implementations are used to facilitate increased speed and reduced power consumption. However, the SW processing becomes a bottleneck when intense SW processing is performed on a data stream, or when SW processing is used to manipulate or transfer large data streams.

As was noted, the integration of the HW processes in a SoC into a flexible system with small software overhead is problematic. High speed fixed connections that can be enabled or disabled, as needed, are known from the prior art. For dynamic connectivity some bus structures have been standardized, such as OMAP™ (Texas Instruments, Inc.). However, these approaches have too low of a transfer capacity, and furthermore do not provide solutions that can integrate multiple simultaneous data streams. The conventional approaches also do not offer a structure for setup and control of the data sources and destinations, nor do they facilitate off-chip process control. Overall, the number of possible data transfer connections such systems allow is low, which limits the flexibility of dynamic data transfer configurations.

The off-chip connections have previously been handled by various serial or parallel communication standards. These conventional approaches, however, are not easily implementable for use as an on-chip data streaming mechanism.

SUMMARY OF THE PREFERRED EMBODIMENTS

The foregoing and other problems are overcome, and other advantages are realized, in accordance with the presently preferred embodiments of this invention.

In one aspect thereof the teachings of this invention provide a data processing system that comprises a main processor that runs an operating system; a microcontrol processor coupled to the main processor that controls a first plurality of hardware processes as directed by the main processor, and a switching matrix controlled by the microcontrol processor and coupled between input ports and output ports of individual ones of the first plurality of hardware processes for routing data between individual ones of the first plurality of hardware processes.

In another aspect thereof the teachings of this invention provide a method to control a system on a chip (SoC). The method includes enabling at least data sources, data sinks and data processing nodes to directly communicate with one another using connections made via switching nodes controlled by at least one microcontrol processor; implementing control of off-chip communication by the at least one microcontrol processor and directing operations of the at least one microcontrol processor with a main processor that runs an operating system. The at least one microcontrol processor functions so as to isolate the main processor from details of the functioning of underlying communications and hardware.

In a further aspect thereof the teachings of this invention provide a unit comprising an interface for coupling to at least one peripheral unit. Each of the unit and the peripheral unit comprise a circuit arrangement, where the circuit arrangement of the unit has a main processor that runs an operating system, or a channel coupled to a main processor that runs an operating system. Each circuit arrangement comprises a local microcontrol processor coupled to the main processor that controls operations of a plurality of local hardware processes, as directed by the main processor, and further comprises a local switching matrix controlled by the local microcontrol processor and coupled between input ports and output ports of individual ones of the plurality of local hardware processes for routing data between individual ones of the plurality of local hardware processes. One of the plurality of local hardware processes comprises the interface, where the interface is for coupling to a bus operable to couple the unit to the peripheral unit. Operations of the local microcontrol processor of the unit are directed through high level, macro commands issued by the main processor, and for execution of some macro commands the microcontrol processor of the unit communicates with the local microcontrol processor of the peripheral unit via the bus.

In a still further aspect, the teachings of this invention provide a peripheral unit comprising an interface for coupling to at least one main unit, where each of the peripheral unit and the main unit comprise a circuit arrangement. The circuit arrangement of the main unit has the main processor that runs the operating system, or a channel coupled to the main processor that runs the operating system. Each circuit arrangement of the peripheral unit and the main unit comprise a local microcontrol processor coupled to the main processor to control a plurality of local hardware processes as directed by the main processor; and further comprise a local switching matrix controlled by the local microcontrol processor and coupled between input ports and output ports of individual ones of the plurality of local hardware processes for routing data between individual ones of the plurality of local hardware processes. One of the plurality of local hardware processes comprises the interface for coupling to a bus operable to couple the peripheral unit to the main unit. Operations of each the local microcontrol processors are directed through macro commands issued by the main processor, and for execution of some macro commands the microcontrol processor of the peripheral unit communicates with the microcontrol processor of the main unit via the bus.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figures 1, 1A:
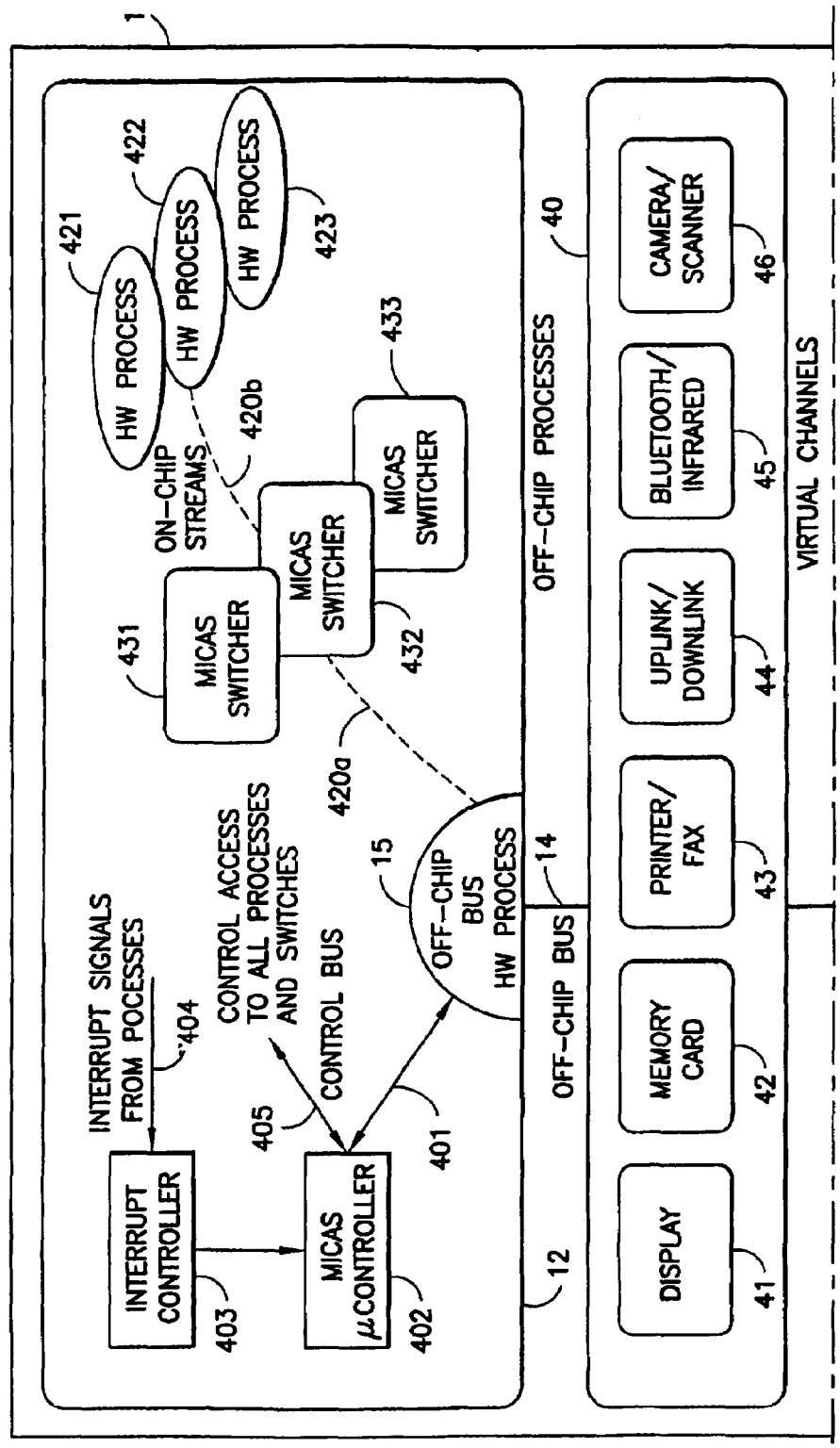
FIG. 1 is a simplified block diagram of a SoC system with on-chip processes and off-chip processes coupled together by a off-chip bus.
Figure 1B:
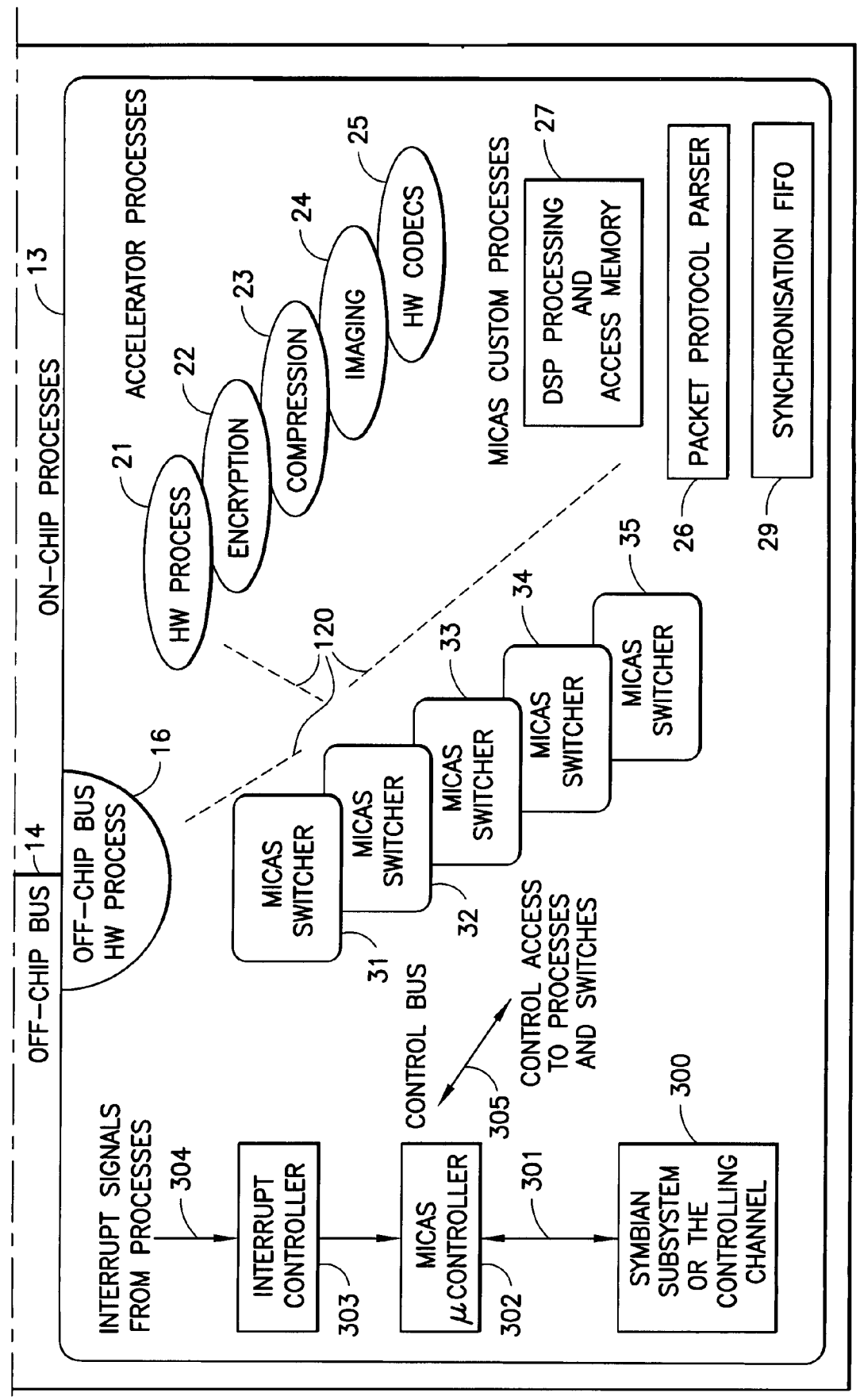

By way of introduction, the embodiments of this invention provide a method and apparatus to control a SoC architecture, where different sources, sinks, buffers and processing nodes communicate using connections controlled by switching nodes. More specifically, the embodiments of this invention enable detailed control of serial data streaming, HW accelerators and off-chip communication, and may be implemented in microcode that is triggered by a main processor.

Control of data stream connections between physical HW processes on the chip, and also to and from virtual processes external to the SoC, is implemented as software running in a separate dedicated microcontroller. The SW used to control the configurable hardware is preferably implemented as microcode, and the HW itself is hidden from the main processor operating system by the microcode being executed in the dedicated microcontroller.

Data streams, including off-chip communications, their sources, sinks and HW accelerators, as well as off-chip processes manipulating the data streams, are presented to the SoC processor as abstract entities. A middle layer of microcode is executed in the dedicated microcontroller for implementing the abstraction of data streams and processes.

A data link to another chip or system is included in the architecture. The data link is preferably virtually multiplexed so that at a higher abstraction level, visible to the SoC processor, both the on-chip physical HW processes and the off-chip processes can be treated as equal elements in the system architecture, referred to herein as the Microcode Architecture for SoC, or MICAS.

Hereafter, the SoC processor is referred to as "the main processor" or as "the SoC main processor", depending on the context. The "SoC software" or the "operating system", for example one known as the Symbian OS™ (http://www.symbian.com), runs in the SoC processor. The dedicated MICAS microcontroller that executes the microcode may be referred to as "the controller", the "microcontroller", or as the "microcode processor".

In the MICAS architecture the processing speed is increased because the data streams may be processed, transferred and accessed directly by HW, with very low software-related delays and little software processing. The HW is capable of transferring data directly without involving the main processor bus. The burden on the operating system is additionally reduced since delays and interrupts are handled by the microcode, rather than by the operating system. In the microcode architecture the HW runs more efficiently and the SoC software is less burdened by low level tasks, resulting in an extremely flexible HW platform for a SoC solution to be obtained.

The microcode architecture allows high speed performance of data streaming applications since it addresses and solves the data transfer bottleneck problem, while still allowing dynamic and programmable behavior of streaming connections. The HW behavior is programmable, resulting in reconfigurable HW being available for processing the data streams.

The consistency of the microcode architecture in accordance with the embodiments of this invention yields a number of advantages. The application of higher level Model Driven Architecture (MDA) design tools is facilitated, and design methods, such as formal proof and verification, become more applicable. Technologies to implement a MDA design flow, based on the Unified Modeling Language (UML) or other languages, are more readily adapted to a coherent architecture such as that presented by the microcode architecture in accordance with the embodiments of this invention. The MDA methodology makes it possible to implement automatic translation of sets of graphically defined models of dynamic HW configurations into microcode by using a predefined meta model of the given HW platform. The translation is defined by the meta model of the HW platform. An advantage that is gained is that one obtains fast microcode implementations of control facilities for new dynamic HW configurations on an existing or a new platform, and a new meta model for a new hardware platform is quickly and easily developed from an existing meta model.

The microcode architecture of the embodiments of this invention handles HW processes such as encoders, decoders, encryptors, decryptors, image processors, packet parsers and flow control elements, such as on-chip data storage, video memory and stream buffering. In addition to such on-chip elements, the microcode architecture includes off-chip processes, such as the wireless uplink, the wireless downlink, mass storage, displays, printers and a camera (image capture). The off-chip processes communicate using an off-chip communications bus, referred to also as an off-chip bus. In the system architecture the off-chip bus provides virtual channels for the off-chip processes.

Elements of the SoC architecture in accordance with the embodiments of this invention include, but need not be limited to: processing elements and on-chip HW modules for the processing of, as non-limiting examples, video and sound, and for handling encryption; decryption; encoding, decoding and compression; packet protocol parsing; flow control elements such as buffers, memories and video memory; I/O elements such as off-chip bus ports; virtual channels for off-chip processes such as, as non-limiting examples, the uplink, downlink, display, camera, printer, infrared, Bluetooth™ (Bluetooth is a registered trademark of Bluetooth Sig, Inc.), flash cards and mass storage; software sub-processing; microcode MICAS control bus; MICAS switchers for on-chip connectivity; interrupt control; MICAS microcontroller with interrupt handling capability and microcode software implementing macro commands for a higher level operating system such as Symbian™; and a calling mechanism between the operating system and the MICAS controller. In this way a relatively high level command can be issued (e.g., to display a graphical image) with arguments, and the specifics of the actual display process are handled at the level of one or more local microcontrol units.

FIG. 1 illustrates a simplified block diagram of a SoC system 1 with exemplary on-chip processes 13 and exemplary off-chip processes 12 coupled together by an off-chip bus 14. The off-chip bus 14 is a point-to-point bus, and may be implemented using asynchronous, self-clocking bus methodology. The use of a plurality of virtual channels 40 is indicated only by way of example. The exemplary indicated hardware processes: display 41, memory 42, printer 43, up and down links 44 (e.g., cellular communication links), short range link (e.g., Bluetooth or IR) 45 and camera/scanner 46, are preferably not actually active on the off-chip bus 14, but are preferably implemented as off-chip HW processes, such as indicated by 421, 422 and 423.

It is preferred that SW controls the on-chip HW processes 13, the exemplary on-chip accelerator processes: HW Process 21, Encryption 22, Compression 23, Imaging 24 and HW Codecs 25, and exemplary custom processes: DSP Processing and Memory Access 27, Packet Protocol Parser 28 and Synchronization FIFO 29, as well as the multiple data streams 120. The control of the off-chip HW processes 421, 422 and 423, and the corresponding MICAS switcher 431, 432, 433 data streams 420a, 420b, is performed by SW in the same way.

The SW that controls the configurable processing, and that handles the data stream routing, is preferably implemented as microcode in the dedicated MICAS microcontrollers 302, 402. A MICAS microcontroller 302, 402 is controlled by higher level commands 301, 401 that are received from a respective subsystem, for example the Symbian™ Subsystem 300, running the SYMBIAN OS™ in the main processor, or another master MICAS subsystem.

The HW accelerator processes 21, 22, 23, 24, 25, 421, 422, 423, as well as the custom processes 27, 28, 29 in the path of a respective data stream, perform the actual data processing. The processing parameters include specific data stream routings and hardware process parameters that are configured during processing setup. These parameters are passed to the processes 21, 22, 23, 24, 25, 421, 422, 423, 27, 28, 29 when needed over control bus 305, 405 from the respective MICAS controller 302, 402. The active values of the parameters, and other status information, can be read from the processes by the MICAS controllers 302, 402 over the control buses 305, 405.

Additionally, information concerning the origin and destination of streams 120, 420, i.e. information about the dynamic connections between the processes, is passed to MICAS switchers 31, 32, 33, 34, 35, 431, 432, 433.

The higher level commands from the subsystem 300 (e.g., via the OS or a channel on the off-chip bus 14) prompt the MICAS controller 302 to execute the task of determining and setting up parameters, or to commission such a task or such commands to the remote MICAS controller 402 by sending messages to the off-chip bus HW process 16. The off-chip bus HW process 16 transfers a message using the off-chip bus 14 to the remote off-chip bus HW process 15. These messages are received by the off-chip bus HW process 15, which generates an interrupt 404 that is handled by an interrupt controller 403 that causes the remote MICAS controller 402 to read the higher level command 401. Thus, the MICAS controller 302 on the chip 13 can implement higher level commands, or can implement higher level commands indirectly via a virtual subsystem on the remote chip 12, by using the remote MICAS controller 402 to read the higher level command 401. This latter mode of operation is possible if, for example, the remote chip 12 is in a slave mode, and the local chip 13 is in a master mode relative to the remote chip 12.

A master subsystem can have several slave subsystems, and a subsystem can be a master for a further slave subsystem. In practice, every one of the virtual channels 40 of the off-chip bus 14 can support a slave subsystem. The master subsystem 300 can be a MICAS system connected over a off-chip bus control channel, or another higher level subsystem with a processor running an operating system (referred to as a controlling channel in FIG. 1).

In general, the interface to the off-chip bus 14, i.e., the off-chip bus HW process 16, can be considered to comprise part of a virtual network that can be dynamically defined by the MICAS microcontroller or processor 302, in cooperation with the OS sub-system or controlling channel 300 (the main processor 300).

The local (on-chip) MICAS controller 302 sets up as needed the parameters required for operation of the local processes 21, 22, 23, 24, 25, and sets up the MICAS switchers 31, 32, 33, 34, 35 on the chip 13. This is accomplished by using read and write access over the control bus 305 to setup and control/command registers of the local processes 21, 22, 23, 24, 25, and to control the switchers 31, 32, 33, 34, 35.

In a similar manner the remote (off-chip) MICAS controller 402 sets up the parameters required for operation of the remote processes 421, 422, 423, and sets up the MICAS switchers 431, 432, 433 on the remote chip 12. This is accomplished using read and write access over the control bus 405 to setup registers of the remote processes 421, 422, 423, and to control the switchers 431, 432, 433.

When the processes 21-25 themselves need to trigger or commission control of the configurable hardware, this too can be accomplished by issuing the required commands through the MICAS controller 302. Any required interrupts 304 from the processes 21-25 are handled by the interrupt controller 303. The on-chip interrupts can advantageously be hardwired for low latency, but the interrupts from the off-chip processes are transferred over the off-chip bus 14. The off-chip bus 14 provides a low latency signaling channel in the link protocol layer, which can be used for low latency interrupting. When an off-chip process 421, 422 or 423 issues such an interrupt 404, the interrupt is received by the interrupt controller 403 and passed on to the remote MICAS controller 402, that in turn sends a message 401 to the off-chip bus hardware process 15. The message is then transferred by the off-chip bus 14 with low latency to the off-chip bus hardware process 16, which then generates a hardwired interrupt 304 that is treated in a manner that is similar to a local on-chip interrupt.

Figure 2:
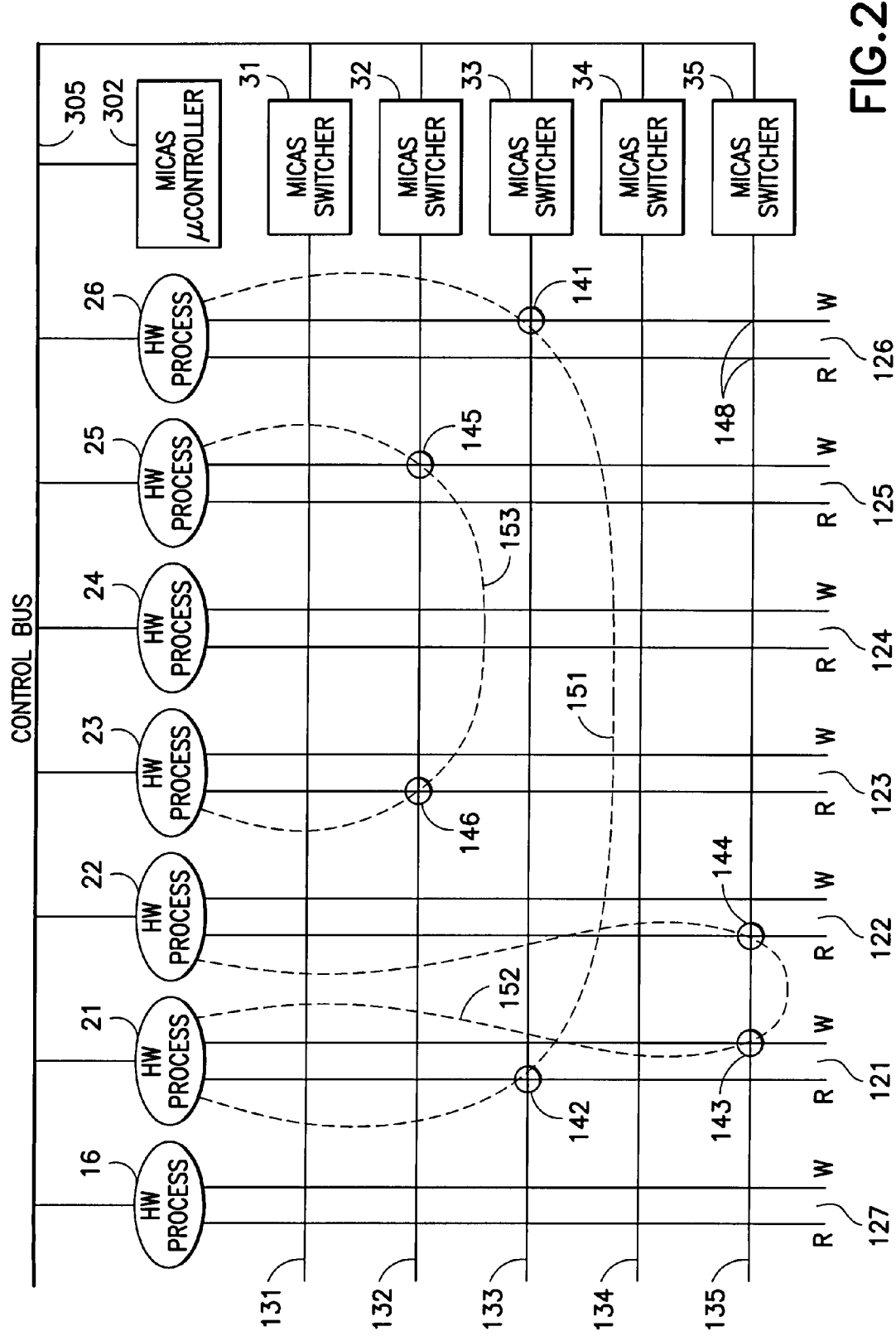
FIG. 2 exemplifies the streaming of data between HW processes under control of MICAS switchers.

FIG. 2 shows by way of example the manner in which the exemplary five MICAS switchers 31, 32, 33, 34, 35 handle the routing of the data streams 131, 132, 133, 134, 135, of which 132, 133 and 135 are assumed to be connected for data transfer in this non-limiting example. Each MICAS switcher 31, 32, 33, 34 and 35 handles one of the data streams 131, 132, 133, 134 and 135, respectively. The MICAS switchers 31, 32, 33, 34, 35 can be implemented simply as switches (e.g., as cross-bar switches), and need not add, or remove, any information from the data stream. The data streams can as well be multiplexed, and comprise virtual channels if the connected processes permit virtual channels. For example, in FIG. 2 the streams 151 and 153 can be multiplexed over the same MICAS switcher 33, without the use of the MICAS switcher 32. Such multiplexed connections are not, however, shown in FIG. 2 in order to maintain the simplicity of the drawing figure, and thus FIG. 2 depicts only the typical use of the switchers 31, 32, 33, 34, 35. Nodes 141, 142, 143, 144, 145 and 146 show Read and Write switch connection points for the streams 151, 152 and 153.

The MICAS switchers 31, 32, 33, 34, 35 may be considered to form a switching array for selectively interconnecting data streams between input and output ports of the processes 16 and 21-26, as well as the processes 27, 28 and 29 (not shown in FIG. 2).

Typically, only the MICAS switcher that is connected to the HW process (the off-chip bus HW process) 16 handles virtual channels. The virtual channels over the off-chip bus 14 are generated and controlled by the dedicated processor 302, and are used to handle the off-chip processes when the remote MICAS processor 402 is operating in slave mode. When the dedicated processor 302 allows, the opposite operation can take place whereby the remote MICAS processor 402 operates as a consented master, and the MICAS processor 302 as a consented slave.

FIG. 2 primarily illustrates how the MICAS switchers 31, 32, 33, 34 and 35 connect data streams between the on-chip HW processes 21, 22, 23, 24, 25 and 26. Although not shown in the example, the MICAS switchers 31, 32, 33, 34 and 35 can also connect data streams between the bus interface hardware process 16 and the custom processes 27, 28 and 29. Each process 16, 21, 22, 23, 24, 25, 26, 27, 28, 29 can have an input/output (I/O) port, such as 121, 122, 123, 124, 125, 126, 127, that uses two separate lines, one for writing (W) and one for reading (R). Switches for reading and writing are connected between the I/O ports and the data streams 131, 132, 133, 134 and 135. In the illustrated example the data stream 151 from the HW process 26 Write output is connected to the HW process 21 Read input via the Write switch of node 141 and the Read switch of node 142. The switches 145 and 146, and all other read or write switches that are connected to the data stream 133, are controlled by the MICAS switcher 33.

It should be noted that not all of these switches need to be implemented, however the absence of one or more of the switches complicates the flow control and may reduce throughput in certain situations, as not all connections may be possible to make.

Figure 3:
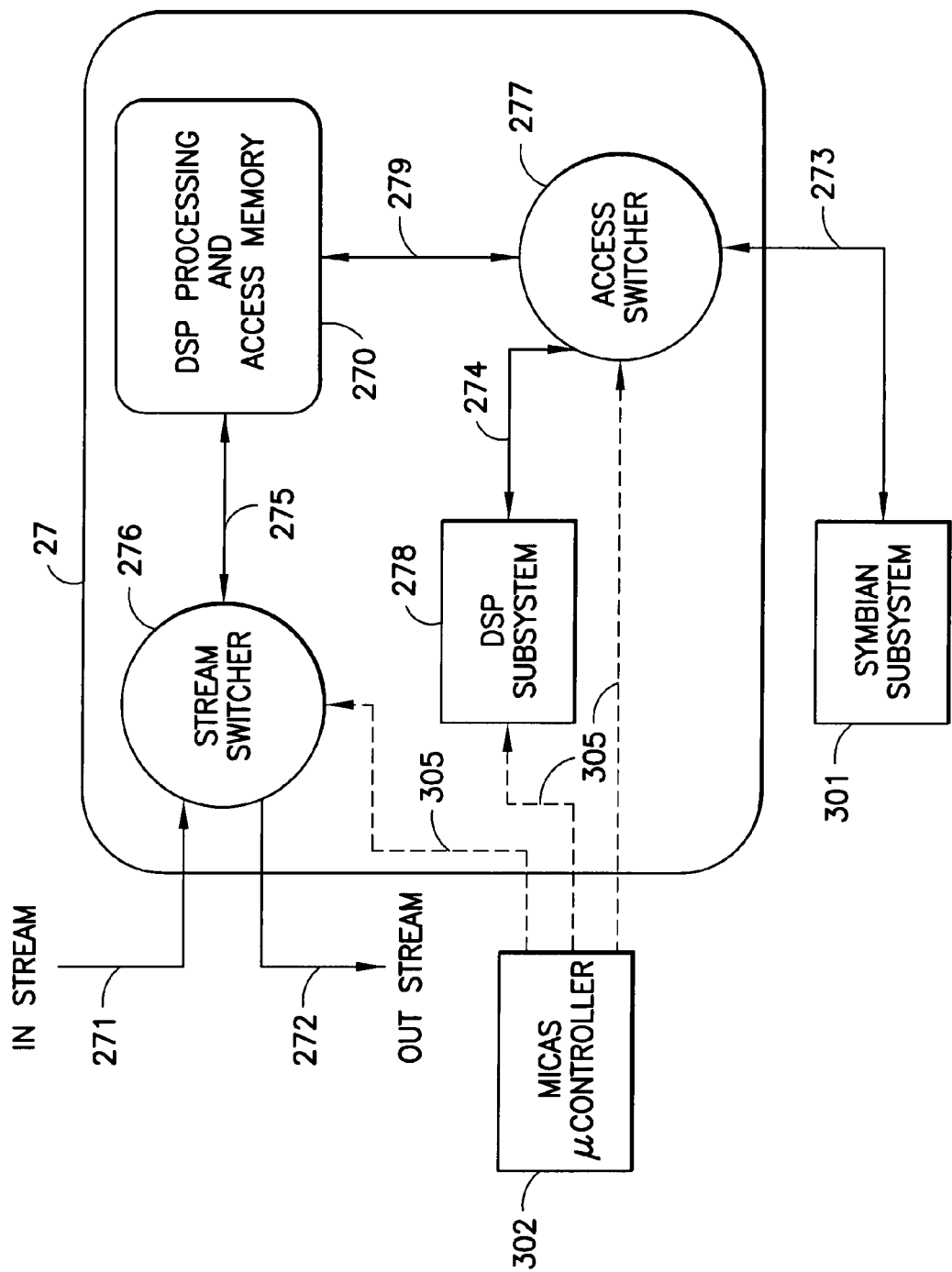
FIG. 3 is a simplified block diagram of a SW processing subsystem.

FIG. 3 exemplifies the manner in which a process that is not handled by a HW accelerator process, such as 21, 22, 23, 24, 25, can be implemented by a software process 27, 28, 29. More specifically, FIG. 3 shows a non-limiting embodiment of the DSP Processing and Access Memory process 27. The MICAS controller 302 has access to the DSP Processing and Access Memory process 27 via at least the control bus 305. The DSP Processing and Access Memory process 27 comprises at least a common access memory 270, where data can be manipulated both by a DSP subsystem 278 and the OS subsystem 300.

The MICAS switchers 31, 32, 33, 34 and 35 have streaming access to the common access memory 270 through an arbiter, referred to in FIG. 3 as a Stream Switcher 276 that is coupled to DSP Processing and Access Memory process 27 I/O ports 271, 272. Data is streamed into port 271 and is streamed out of port 272 using the MICAS switchers 31, 32, 33, 34, 35. Using the Stream Switcher 276, the data streams can be sequentially written to or sequentially read from the access memory 270.

SW processing in the DSP subsystem 278, or in the Symbian OS™ subsystem 301, has access over bus 279 to the common access memory 270 via a second arbiter, referred to as an Access Switcher 277. The Access Switcher 277 allows an active processor, either the DSP subsystem 278 or the Symbian OS™ subsystem 300, as determined by the configuration of the arbiter (Access Switcher) 277, to manipulate the content of the access memory 270 via the switched connections 274 or 273, respectively.

Using the control bus 305 the MICAS controller 302 has control access to the Stream Switcher 276, the arbiter Access Switcher 277 and to the DSP subsystem 278, thereby facilitating the setup of configurations in these processes and further triggering and controlling these processes.

Figure 4:
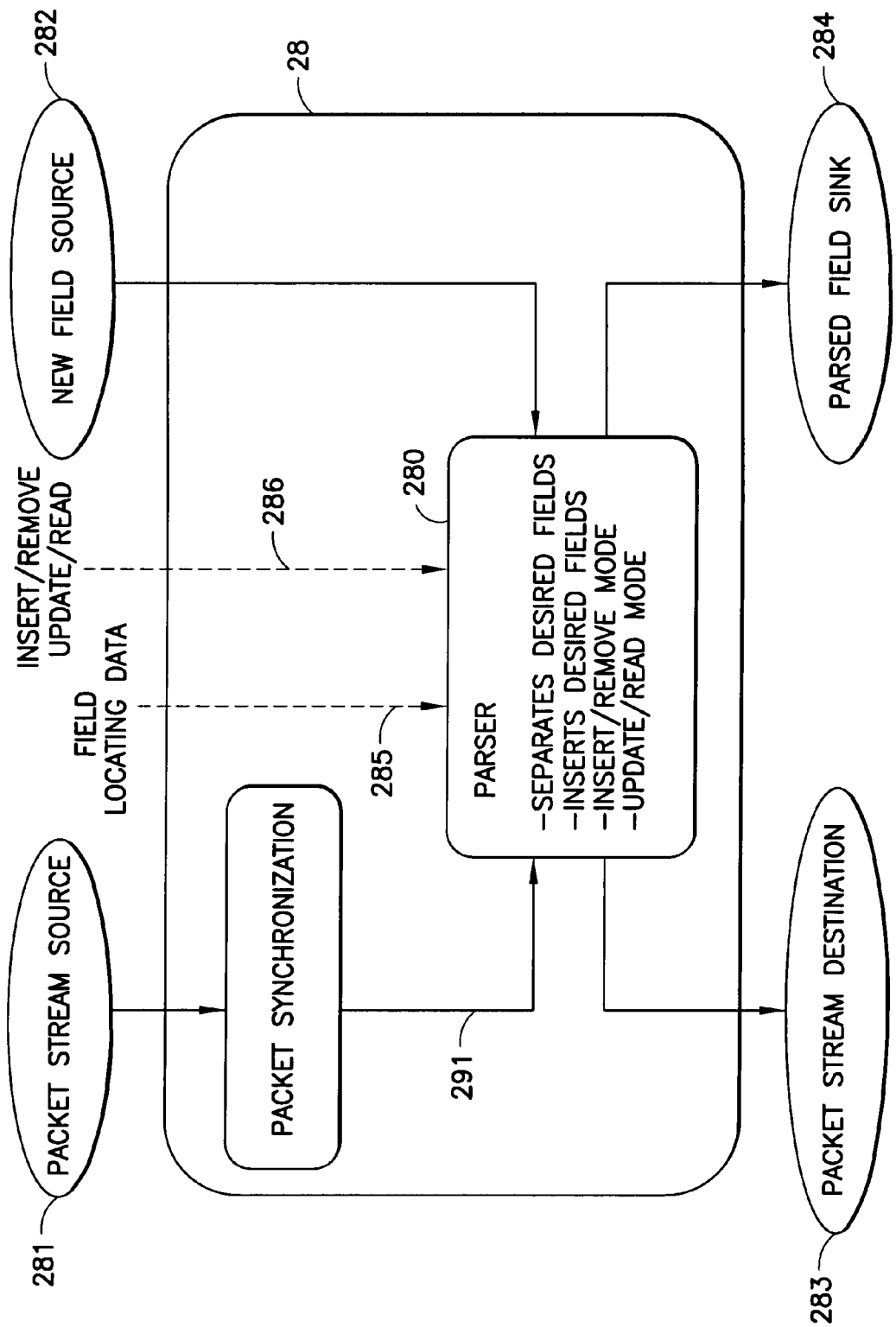
FIG. 4 is a simplified block diagram of a packet protocol parser.

FIG. 4 also exemplifies the manner in which a process that is not handled by a HW accelerator process, such as 21, 22, 23, 24, 25, can be implemented by a software process 27, 28, 29. More specifically, FIG. 4 shows a non-limiting embodiment of the Packet Protocol Parser 28 of FIG. 1. In FIG. 4 an incoming packet stream from a Packet Stream Source 281 is routed to be synchronized in a packet synchronizer 290. The synchronized output stream 291 is passed to a parser 280 which produces as outputs a Packet Stream Destination 283 and a Parsed Field Sink 284. An additional input, referred to as a New Field Source 282, provides any data that may be needed for inserting into, or updating, the fields of the packet stream.

The input ports 281, 282 and the output ports 283, 284 are routed from their sources to their destinations by the MICAS switchers 31, 32, 33, 34 and 35. Control data referred to as Field Locating Data 285 and Insert/Remove, Update/Read 286 is defined by the MICAS controller 302, 402 via the control bus 305, 405, in the manner previously described.

The parser 280 operates to separate and identify one or more parsed fields, defined by the Field Locating Data 285, and to send the parsed fields to the Parsed Field Sink 284. Although not shown in FIG. 4, corresponding field locating data is also available to the synchronizer 290.

The parser 280 can operate in at least four different modes defined as Insert, Remove, Update and Read. The operational mode is defined by the MICAS controller 302 using the input value 286. In the Insert mode the data defined by the New Field Source 282 is inserted before the parsed fields, in the Update mode the parsed fields are overwritten with the data defined by the New Field Source 282. The resulting stream is sent to the Packet Stream Destination 283. In the Remove mode the parsed fields are removed from the Packet Stream Source 281 and sent to the Packet Stream Destination 283. In the Read mode the Packet Stream Source 281 is sent to the Packet Stream Destination 283 without modification.

Several parsing tasks can be active at the same time. Either several packet protocol parses or one process, acting as a set of packet protocol parsers, can be implemented in the presently preferred embodiments of this invention. The synchronization FIFO 29 can be used to support iterative parsing.

In the preferred embodiment of the SoC architecture, the main processor 300 (that executes the OS or a controlling channel) in FIG. 1 controls the data flow and HW acceleration for the entire architecture. The main processor 300 may use an operating system such as, but not limited to, the Symbian OS™ to pass control commands via the MICAS controller 302 to the software assisted MICAS subsystem that sets up and controls processes and data flow. These processes can be one or both of on-chip and off-chip processes. These processes can be interconnected via the virtual channels 40 of the bus 14, or by data streams 120, 420.

Figure 5:
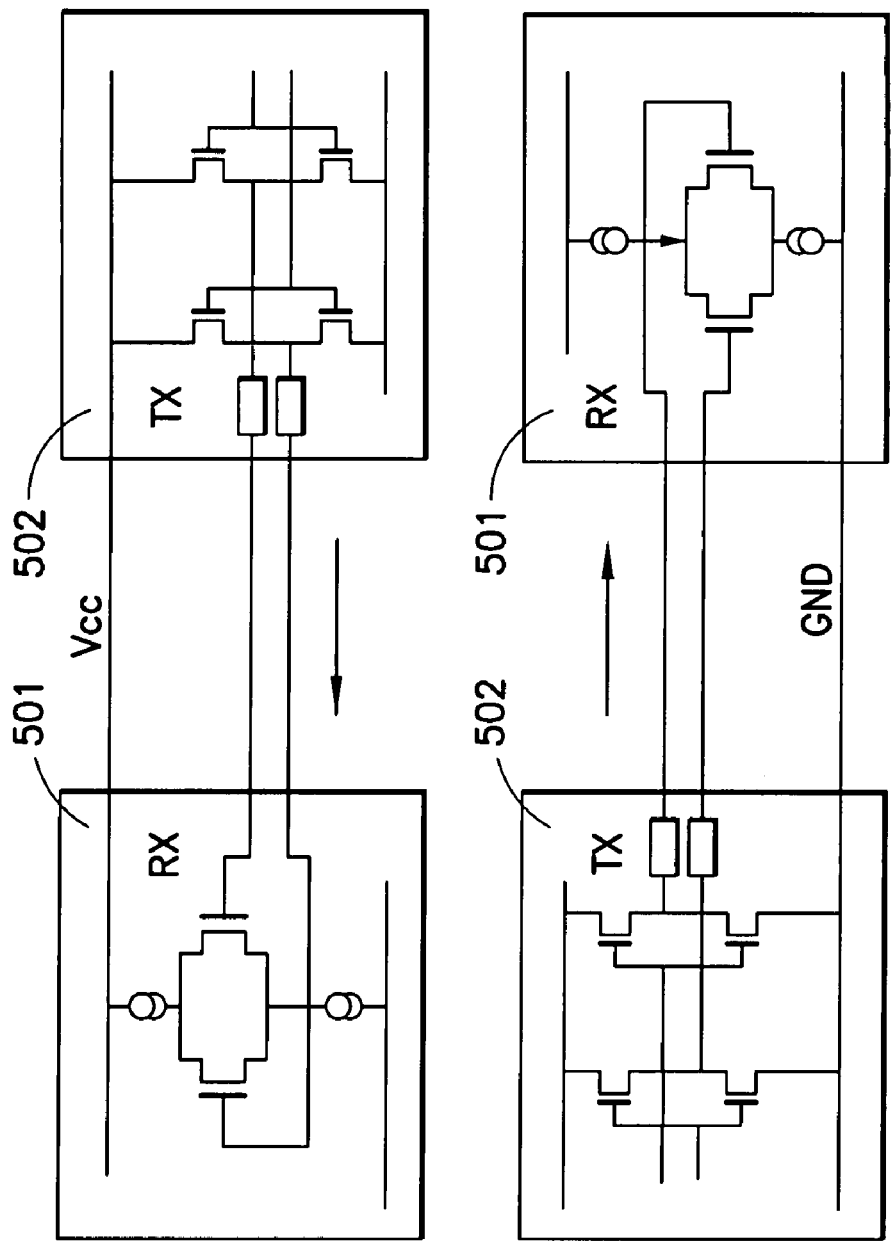
FIG. 5 depicts an off-chip interface for transmitting and receiving differential multilevel signals.

FIG. 5 illustrates a full duplex on-chip bus 14 implementation that uses dual differential lines to carry multilevel signals from transmitters (TX) 502 to receivers (RX) 501. Such a bus can be used for on-chip communication as well, in the same or in a simplified form thereof.

Based on the foregoing description it should now be apparent that the embodiments of this invention solve a number of problems that exist in the prior art. For example, processor-based implementations do not lend themselves to fast data processing, and approaches such as OMAP™ are slow and do not offer an optimum technique to control data streaming as a whole, i.e., data passing over data paths between various data source-sink configurations, in a consistent and centralized way.

One possible technique to implement the MICAS architecture may use uses several connection switches and a microprocessor to control the bus 14 and the HW accelerators 21-25. In general, the MICAS architecture may be based on a combination of microcode-controlled technologies. The technologies of low power microcontrollers and HW communications protocols enables designing microcode-based control of data flow between HW processes without compromising power requirements.

Thus, the elements that the microcode SW connects are on-chip HW modules, flow control elements and channels on off-chip buses. In one particularly useful architecture, every entity may be connected to all (or to most of all) other entities via a switching matrix. One particularly efficient strategy has the interconnection scheme use the same methods as the off-chip bus 14. All elements in the microcode architecture are connected to each other by means of off-chip and on-chip bus systems.

There are a number of synergistic benefits of using the off-chip bus 14 technology for the on-chip system interconnections. For example, the use of off-chip bus 14 technology facilitates the integration of off-chip sources and sinks, thereby simplifying the implementation of modern multimedia terminals.

In one aspect thereof, the embodiments of this invention provide on-chip processing methods, in another aspect thereof the embodiments of this invention provide off-chip processing methods, and in a third aspect thereof the embodiments of this invention provide both on-chip and off-chip processing methods, using the same basic control and bus structures.

The embodiments of this invention as described above may be used to implement a wide variety of equipment and terminals, including as examples, cellular telephones, personal digital assistants (PDAs), portable computers, image capture devices such as digital cameras, gaming devices, music storage and playback appliances, Internet appliances permitting wired and/or wireless Internet access and browsing, as well as portable and non-portable units or terminals that incorporate combinations of such functions. The embodiments of this invention as described above may also be used to implement a variety of peripheral devices (e.g., printer/fax, or printer/scanner) that connect to a unit or terminal via the off-chip bus 14.

It can be noted that there may be a plurality of interfaces to a corresponding plurality of virtual channel buses for coupling to a corresponding plurality of microcontrol processors, each controlling further hardware processes, and a corresponding plurality of switching matrices coupled between input ports and output ports of individual ones of the further hardware processes. Thus, a data processing system, such as one represented by the on-chip processes 13, can be coupled to an arbitrary number of further data processing systems, and so forth, in a hierarchical, possibly tree-like fashion. For example, in FIG. 1 the data processing system represented by the off-chip processes 12 can include one or more additional off-chip bus hardware process, similar or identical to 15, that couples it to further data processing system(s) (e.g., peripheral unit(s) of a peripheral unit) via one or more additional virtual channels.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent data stream switching techniques, different operating systems (e.g., Linux™), and different HW and SW processes, and numbers of HW and SW processes, may be attempted by those skilled in the art. However, all such and similar modifications of the teachings of this invention will still fall within the scope of the embodiments of this invention.

Further, while the embodiments of this invention have been described in the context of a system on a chip (SoC) architecture, it can be appreciated that the use of the embodiments of this invention is not limited to only SoC architectures, and that at least some aspects of the embodiments of this invention may be applied as well to data processing systems comprised of multiple chips and hardware elements.

Furthermore, some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A data processing system, comprising:
 a main processor integrated on-chip in a single integrated circuit that runs an operating system; and
 an on-chip microcontrol processor coupled to said main processor and executing at least one software process separate from the operating system to setup and control a plurality of on-chip hardware processes in accordance with higher level commands of said main processor, where the higher level commands comprise prompting the on-chip microcontrol processor to perform at least one of relaying the higher level commands via an interface for implementation off-chip or implementing the higher level commands on-chip via an on-chip switching matrix controlled by said on-chip microcontrol processor and coupled between input ports and output ports of individual ones of said plurality of on-chip hardware processes for routing data between individual ones of said plurality of on-chip hardware processes.

2. A data processing system as in claim 1, where the interface comprises a virtual channel bus for coupling to an off-chip microcontrol processor that executes at least one software process separate from the operating system to control a plurality of off-chip hardware processes in accordance with the high level commands relayed by the on-chip microcontrol processor; and an off-chip switching matrix that is coupled between input ports and output ports of individual ones of said plurality of off-chip hardware processes.

3. A data processing system as in claim 2, where the said virtual channel bus comprises an asynchronous, self-clocking bus.

4. A data processing system as in claim 2, where data streams that travel on-chip and also off-chip, their sources, sinks and hardware processes, and off-chip processes that manipulate data streams, appear to said main processor as abstract entities.

5. A data processing system as in claim 2, where microcontrol is executed by said on-chip microcontrol processor and the microcontrol makes data streams, their sources, sinks and hardware processes, and off-chip processes that manipulate data streams, appear to said main processor as abstract entities.

6. A data processing system as in claim 2, where said main processor views both on-chip and off-chip processes as equivalent processes.

7. A data processing system as in claim 2, where said plurality of off-chip hardware processes comprise functions selected from at least one of wireless uplink, wireless downlink, mass storage, display, printing, local short-range communication, data storage and image capture.

8. A data processing system as in claim 1, where operation of at least some of said plurality of on-chip hardware processes is reconfigurable by said on-chip microcontrol processor.

9. A data processing system as in claim 1, where said plurality of on-chip hardware processes comprise functions selected from at least one of encoding, decoding, encrypting, decrypting and image processing.

10. A data processing system as in claim 1, where said at least one software process comprises a packet parsing and flow control function.

11. A data processing system as in claim 1, where said at least one software process comprises a digital signal processor function.

12. A data processing system as in claim 1, where said on-chip microcontrol processor implements macro commands for the operating system, and also implements a calling mechanism between the operating system and the on-chip microcontrol processor.

13. A data processing system as in claim 1, further comprising a plurality of interfaces to a corresponding plurality of virtual channel buses for coupling to a corresponding plurality of on-chip microcontrol processors each controlling further hardware processes, and a corresponding plurality of switching matrices coupled between input ports and output ports of individual ones of said further hardware processes.

14. The data processing system of claim 1, where controlling the plurality of on-chip hardware processes in accordance with the higher level commands of the main processor comprises the higher level commands prompting the on-chip microcontrol processor to determine and setup processing parameters and communicate the processing parameters to the plurality of on-chip hardware processes via the on-chip switching matrix.

15. The data processing system of claim 14, comprising the on-chip microcontrol processor triggering and controlling the plurality of on-chip hardware processes based on the processing parameters, where delays and interrupts of data flow between the individual ones of the plurality of on-chip hardware processes are handled by said at least one software process independent of the operating system.

16. An apparatus, comprising:
an interface coupled to a bus and configured to couple said apparatus to at least one peripheral unit, said apparatus comprising a circuit arrangement, said circuit arrangement of said apparatus having a main processor integrated on-chip in a single integrated circuit and configured to run an operating system; and
said circuit arrangement of said apparatus comprises an on-chip microcontrol processor coupled to said main processor and configured to execute at least one software process separate from the operating system to setup and control a plurality of on-chip hardware processes in accordance with higher level commands of said main processor, where the higher level commands comprise prompting the on-chip microcontrol processor to perform at least one of relaying the higher level commands via the interface to the at least one peripheral unit for implementation off-chip or implementing the higher level commands on-chip via
an on-chip switching matrix controlled by said on-chip microcontrol processor and coupled between input ports and output ports of individual ones of said plurality of on-chip hardware processes configured to route data between individual ones of said plurality of on-chip hardware processes.

17. The apparatus as in claim 16, where said plurality of on-chip hardware processes comprise functions selected from at least one of encoding, decoding, encrypting, decrypting and image processing.

18. The apparatus as in claim 16, further comprising an on-chip packet parsing and flow control function.

19. The apparatus as in claim 16, further comprising an on-chip digital signal processor function.

20. The apparatus as in claim 16, where said interface and bus implement at least one virtual channel associated with at least one of wireless uplink, wireless downlink, display, printing, local short-range communication, data storage and image capture functions.

21. The apparatus as in claim 16, where said circuit arrangement of at least said apparatus is characterized by a system on a chip architecture.

22. The apparatus of claim 16, where controlling the plurality of on-chip hardware processes in accordance with the higher level commands of said main processor comprises the higher level commands prompting the on-chip microcontrol processor to determine and setup processing parameters and communicate the processing parameters to the on-chip hardware processes via the on-chip switching matrix.

23. The apparatus of claim 22, comprising the on-chip microcontrol processor triggering and controlling the plurality of on-chip hardware processes based on the processing parameters, where delays and interrupts of data flow between the individual ones of the plurality of on-chip hardware processes are handled by said at least one software process independent of the operating system.

24. A peripheral unit, comprising:
an interface configured to couple said peripheral unit to at least one main unit, each of said peripheral unit and said main unit comprising a circuit arrangement, said circuit arrangement of said main unit having a main processor that runs an operating system;
the circuit arrangement of said peripheral unit comprising a local microcontrol processor coupled to said main processor and configured to execute at least one software process separate from the operating system in order to setup and control a plurality of local hardware processes in accordance with higher level commands of said main processor relayed to the local microcontrol processor via the interface; and
further comprising a local switching matrix controlled by said local microcontrol processor and coupled between input ports and output ports of individual ones of said plurality of local hardware processes configured to route data between individual ones of said plurality of local hardware processes; where one of said plurality of local hardware processes comprises said interface, said interface coupled to a bus and configured to couple said peripheral unit to said main unit.

25. A peripheral unit as in claim 24, where said microcontrol processor of said peripheral unit operates as a slave to said microcontrol processor of said main unit via said bus.

26. A peripheral unit as in claim 24, where said microcontrol processor of said main unit operates as a consented slave to said microcontrol processor of said peripheral unit via said bus.

27. A peripheral unit as in claim 24, where said plurality of local hardware processes comprise functions selected from at least one of encoding, decoding, encrypting, decrypting and image processing.

28. A peripheral unit as in claim 24, further comprising a local packet parsing and flow control function.

29. A peripheral unit as in claim 24, further coupled to a local digital signal processor function via said bus.

30. A peripheral unit as in claim 24, where said interface and bus implement at least one virtual channel associated with at least one of wireless uplink, wireless downlink, display, printing, local short-range communication, data storage and image capture functions.

31. A peripheral unit as in claim 24, where said circuit arrangement of at least said main unit is characterized by a system on a chip architecture.

32. A method, comprising:
running an operating system on a main processor integrated on-chip in a single integrated circuit; and
executing at least one software process separate from the operating system with an on-chip microcontrol processor to setup and control a plurality of on-chip hardware processes in accordance with higher level commands of the main processor, where the higher level commands comprise prompting the on-chip microcontrol processor to perform at least one of relaying the higher level commands via an interface for implementation off-chip or implementing the higher level commands on-chip via an on-chip switching matrix coupled between input ports and output ports of individual ones of said plurality of on-chip hardware processes for routing data between individual ones of said plurality of on-chip hardware processes.

33. A method as in claim 32, where the interface comprises a virtual channel bus for coupling to an off-chip microcontrol processor that executes at least one software process separate from the operating system to control a plurality of off-chip hardware processes in accordance with the high level commands relayed by the on-chip microcontrol processor; and an off-chip switching matrix that is coupled between input ports and output ports of individual ones of said plurality of off-chip hardware processes.

34. The method of claim 32, where controlling the plurality of on-chip hardware processes in accordance with the higher level commands of the main processor comprises the higher level commands prompting the on-chip microcontrol processor to determine and setup processing parameters and communicate the processing parameters to the plurality of on-chip hardware processes via the on-chip switching matrix.

35. The method of claim 34, comprising the on-chip microcontrol processor triggering and controlling the plurality of on-chip hardware processes based on the processing parameters, where delays and interrupts of data flow between the individual ones of the first plurality of hardware processes are handled by said at least one software process independent of the operating system.

36. A computer readable medium encoded with a computer program executable by a processor to perform actions comprising:
running an operating system on a main processor integrated on-chip in a single integrated circuit; and
executing at least one software process separate from the operating system with an on-chip microcontrol processor to setup and control a plurality of on-chip hardware processes in accordance with higher level commands of the main processor, where the higher level commands comprise prompting the on-chip microcontrol processor to perform at least one of relaying the higher level commands via an interface for implementation off-chip or implementing the higher level commands on-chip via an on-chip switching matrix coupled between input ports and output ports of individual ones of said plurality of on-chip hardware processes for routing data between individual ones of said plurality of on-chip hardware processes.

37. The computer readable medium encoded with a computer program of claim 36, where the interface comprises a virtual channel bus for coupling to an off-chip microcontrol processor that executes at least one software process separate from the operating system to control a plurality of off-chip hardware processes in accordance with the high level commands relayed by the on-chip microcontrol processor; and an off-chip switching matrix that is coupled between input ports and output ports of individual ones of said plurality of off-chip hardware processes.

* * * * *